United States Patent [19]

Zanini-Fisher et al.

[11] Patent Number: 5,264,075

[45] Date of Patent: Nov. 23, 1993

[54] FABRICATION METHODS FOR SILICON/GLASS CAPACITIVE ABSOLUTE PRESSURE SENSORS

[75] Inventors: Margherita Zanini-Fisher, Bloomfield; Michael H. Parsons, Ann Arbor; Kathirgamasundaram Sooriakumar, Dearborn Heights; Russell J. Haeberle, Plymouth; Shaun L. McCarthy, Ann Arbor, all of Mich.

[73] Assignee: Ford Motor Company, Dearborn, Mich.

[21] Appl. No.: 972,688

[22] Filed: Nov. 6, 1992

[51] Int. Cl.$^5$ ............... H01L 21/306; B44C 1/22; C03C 15/00; C23F 1/00

[52] U.S. Cl. ................. 156/633; 156/634; 156/643; 156/651; 156/656; 156/657; 156/661.1; 156/662; 437/228; 437/245

[58] Field of Search ............ 156/633, 634, 643, 647, 156/651, 653, 656, 657, 659.1, 661.1, 662; 361/283, 405; 73/718, 724; 357/26; 29/25.41; 437/226, 228, 238, 241, 245

[56] References Cited

U.S. PATENT DOCUMENTS

| | | | |
|---|---|---|---|
| 4,277,814 | 7/1981 | Giachino et al. | 361/283 |
| 4,386,453 | 6/1983 | Giachino et al. | 29/25.41 |
| 5,000,817 | 3/1991 | Aine | 156/633 |

*Primary Examiner*—William A. Powell
*Attorney, Agent, or Firm*—Allan J. Lippa; Roger L. May

[57] ABSTRACT

A method for making pressure sensors is disclosed. A wafer of doped silicon or other semiconductive material is selectively chemically etched (micromachined) on both sides to form a plurality of diaphragms, a thicker silicon rim surrounding each diaphragm, and a feed-through hole corresponding to each diaphragm external to the silicon rim. A small metallized area of the upper surface of the silicon substrate on the rim adjacent each diaphragm permits external electrical connection to the silicon plate. Capacitor plates are formed by depositing a metallized film or other conductive material on a dielectric substrate in locations corresponding to the diaphragms of the silicon wafer. To permit external electrical connection to the conductive material, contact pads electrically connected to the conductive material are formed on the dielectric substrate external to the area corresponding to the diaphragms. A buffer layer of nonconductive material is disposed over the entire dielectric substrate, and then selectively removed from the contact pads. The lower surface of the silicon substrate is joined to the dielectric substrate, such that the diaphragms formed in the semiconductor material are in alignment with the conductive areas of the dielectric substrate and the contact pads on the dielectric substrate are in alignment with the feedthrough holes in the silicon wafer. The resulting assembly comprises a plurality of electric capacitors and may be cut into individual capacitive pressure sensors.

19 Claims, 4 Drawing Sheets

FABRICATION METHODS FOR SILICON/GLASS CAPACITIVE ABSOLUTE PRESSURE SENSORS

BACKGROUND OF THE INVENTION

Field Of The Invention

This invention relates to silicon/glass capacitive pressure sensors and to methods of making such sensors. In particular, this invention pertains to silicon/glass capacitive pressure sensors.

Background Of The Invention

Capacitive pressure sensors have been developed that are particularly suited for measuring absolute pressure in applications such as the intake manifold of an internal combustion engine where the pressure measurement is required to provide air flow information for use in metering fuel to the engine. Capacitive pressure sensors based on silicon are preferred for such applications because they have a much smaller temperature sensitivity than certain known piezoresistive devices, which need to be temperature compensated.

Pressure sensors such as that described in U.S. Pat. No. 4,277,814, assigned to the assignee of the present invention, comprise at least two spaced conductive plates subject to variation in the spacing between the plates in response to fluctuations in fluid pressure acting on at least one of the plates. The variation in spacing affects the electrical capacitance between the plates, which may be measured as an indication of the fluid pressure acting on the plate(s).

Such capacitive pressure sensors have been constructed with a dielectric material (such as glass or silicon) as a base, on which a metal capacitor plate is formed. The other capacitor plate may be formed of doped silicon or other semiconductor material. Means are provided for external electrical connections to both capacitor plates. If the pressure sensor is intended to measure absolute pressure, the gap between the capacitor plates must typically be hermetically sealed to provide a vacuum or constant pressure between the plates.

SUMMARY OF THE INVENTION

Silicon/glass capacitive absolute pressure sensors made according to the method of the present invention may be advantageously batch fabricated by chemically etching ("micromachining") silicon wafers, such as commercially available 100 millimeter (4-inch), oriented single-crystal silicon wafers. Such silicon wafers are typically about 600 µm thick, but the method of the present invention may be successfully practiced using, for example, silicon wafers of 400 µm or thicker. Preferably, the upper and lower surfaces of the silicon wafer are (100) crystallographic planes.

One aspect of preferred methods of the invention is the avoidance of any need to drill through the glass substrate. The elimination of the holes in the glass, and the process step required to form them, removes one practical limitation on the thickness of the glass substrate. Thus, thicker and more robust glass substrates, to add physical strength and to reduce the thermal stress between the device and its package, may be used in the practice of the invention.

In addition, elimination of the holes through the glass substrate avoids the complexity of metallizing such holes or otherwise providing a conductive path through the dielectric material. Such holes typically must be sealed with solder plugs which are susceptible to thermal cycling and cracking, a disadvantage avoided by the present invention.

Another aspect of certain preferred methods according to the present invention is the independence of the thickness of the diaphragm, forming one of the capacitor plates, from that of the silicon wafer. Because the diaphragm is formed by etching both sides of the substrate, the silicon wafer may be much thicker than the diaphragm, and can thus be made less susceptible to breakage or other damage during the fabrication process. A rim that retains preferably the entire thickness of the silicon wafer surrounds and protects the diaphragm and also provides a convenient location for electrical connection of the device to an external circuit.

Furthermore, by appropriate selection of the diaphragm thickness and the cavity depth, the sensitivity and non-linearity of the device can be varied widely to suit particular applications.

Yet another aspect of preferred methods of the present invention is the ease with which a hermetic seal may be formed within the capacitive chamber. Because an electrical interconnect is provided, preferably as a metal layer formed on the inner surface of the glass substrate and covered by a buffer layer, preferred embodiments of the invention have no hole or other passage communicating between the interior and the exterior of the chamber that must be sealed.

A still further aspect of the most preferred embodiments of the present invention is that all of the process steps are accurately controllable and are adapted to batch fabrication techniques well known in the electronic integrated circuit (IC) manufacturing industry. Properly implemented, batch fabrication methods of the invention provide good product yield, good product consistency, and favorable production costs and efficiency.

In a preferred method for fabricating a capacitive absolute pressure sensor according to the present invention, an electrically conductive semiconductor substrate and a dielectric substrate are prepared separately, then joined. The semiconductor substrate comprises a diaphragm, means for electrically connecting the semiconductor substrate to an external electrical circuit, and means electrically isolated from the semiconductor substrate wafer for connecting the external electrical circuit to a capacitor plate on the dielectric substrate. The dielectric substrate is prepared by disposing a metal capacitor plate and means for connecting the metal capacitor plate to the external electrical circuit upon an upper surface of the dielectric substrate, and by covering the upper surface of the dielectric substrate, including the metal capacitor plate and the means for connecting the metal capacitor plate to the external electrical circuit, but excluding an area adjacent the means for connecting the metal capacitor plate to the external electrical circuit, with a buffer layer of nonconductive material. The semiconductor substrate is then joined to the dielectric substrate such that a capacitive chamber is formed between the diaphragm of the semiconductor substrate and the metal capacitor plate of the dielectric substrate, and such that a hermetic seal is formed between the diaphragm and the metal capacitor plate.

Additional aspects of the present invention will be apparent from the following detailed description of certain preferred embodiments of the invention.

DETAILED DESCRIPTION OF CERTAIN PREFERRED EMBODIMENTS

Figure 1:
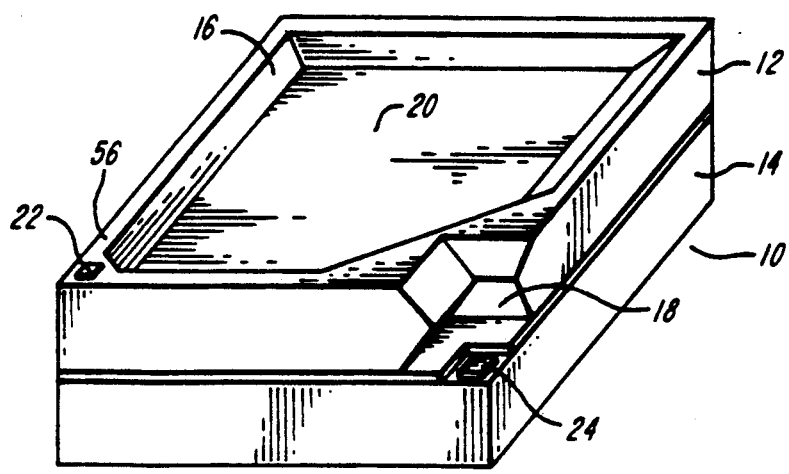
FIG. 1 is a perspective view of an individual capacitive absolute pressure sensor constructed according to the present invention.

In the discussion below and in the claims which follow it should be understood that all directional terms including, for example, references to an upper or lower surface of a component, are used for convenience and correspond generally to the orientation illustrated in the drawings. Such terms are not meant to limit the invention to any particular configuration or to use in any particular orientation.

Referring first to FIG. 1, a preferred product of the present invention is a silicon/glass capacitive absolute pressure sensor 10 comprising a generally planar silicon substrate 12 joined to a generally planar glass substrate 14. The silicon substrate 12 is made from a wafer of doped silicon, preferably a p-type silicon degenerately doped to a resistivity of less that 0.01 ohms-cm$^{-1}$, so that it is electrically conductive. The silicon substrate 12 includes a rim 16, a feedthrough area 18, and a diaphragm 20. A metallized area 22 is formed on the upper surface 56 of the rim 16 to facilitate electrical connection to the silicon substrate.

The glass substrate 14 includes a contact pad 24 located within the area corresponding to the feedthrough area 18 of the silicon substrate 12. The glass substrate may be of any desired thickness, typically having a thickness of 700 μm or more.

Figure 2A:
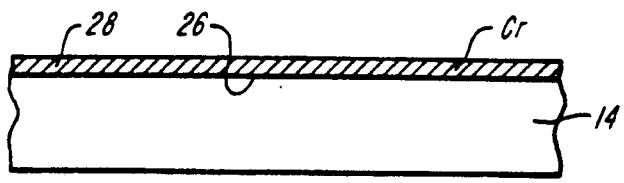
FIGS. 2A–2G illustrate steps in the fabrication of the glass substrate according to a preferred embodiment of the present invention.

Referring now to FIGS. 2A–2G, the fabrication of the glass substrate according to a preferred method of the present invention is disclosed. As shown in FIG. 2A, the upper surface 26 of the glass substrate 14 is first metallized by any of several methods known in the art, such as by electron beam evaporation. A chromium layer 28 of 1000Å–2000Å is preferred, but other suitable metals may be applied using known metallization methods to achieve a comparable result.

Figure 5:
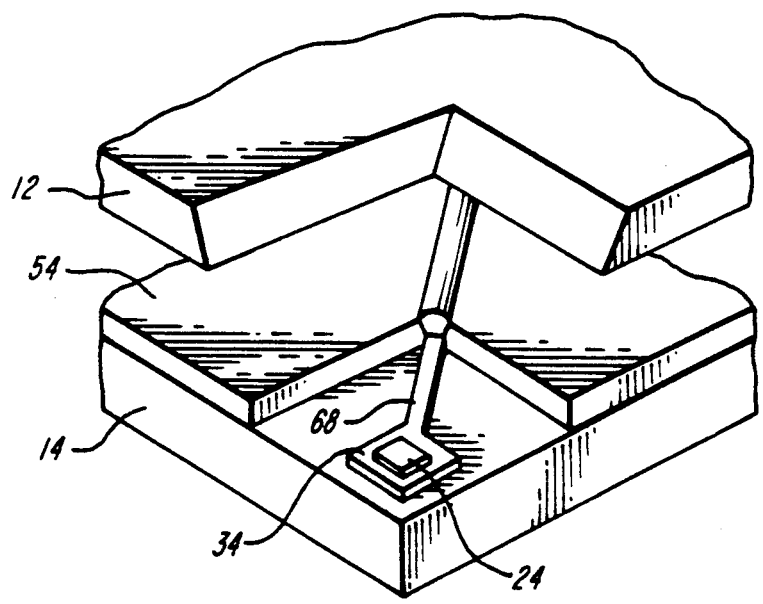
FIG. 5 is an exploded perspective view of a portion of an individual capacitive absolute pressure sensor constructed according to the present invention.
Figure 2B:
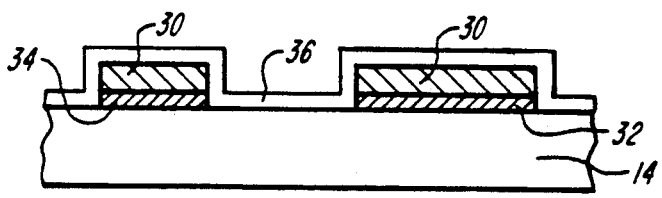

Turning now to FIG. 2B, the chromium layer 28 is selectively removed, using a lithographic procedure employing a photoimagable polyimide or photoresist 30 and chemical etching techniques known in the art, such that the remaining metal forms a capacitor plate 32, a base 34 for the contact pad 24 and an interconnect (not shown) electrically connecting the base 34 to the capacitor plate 32. The capacitor plate 32 is advantageously formed to the approximate size and configuration of the diaphragm 20. A preferred configuration of the base 34, the interconnect 68, and the contact pad 24 is shown in FIG. 5.

After the etching, and prior to removal of the photoresist 30, a silicon oxide layer 36, of thickness equal to that of the chromium layer 28 is deposited over the entire upper surface of the substrate. While other suitable materials, such as sputtered pyrex (borosilicate), may be used under appropriate processing conditions, plasma enhanced chemical vapor deposition (PECVD) silicon oxide, deposited at 140° C., is preferred for this purpose, because it is easily removed during the lift-off process by dissolving the photoresist in acetone. Sputter deposition of pyrex (borosilicate) may also be used, but is less preferred because it tends to harden the photoresist due to the associated high dose ion bombardment and increased substrate temperature, resulting in more defects in the subsequent lift-off step.

Figure 2C:
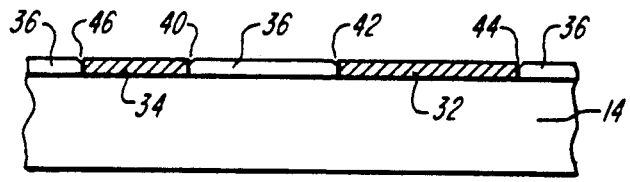

Following application of the silicon oxide layer 36, the photoresist 30 is removed by soaking the substrate in an acetone bath. Ultrasonic agitation may be used to dissolve the photoresist 30 to aid in the lift-off process. The resulting structure, illustrated in FIG. 2C, is characterized by an essentially planar surface with minimal step-height differences at the boundaries 40, 42, 44, 46 between different materials. When properly controlled, the process of the present invention results in maximum step height differences on the order of 100Å or less on the entire wafer.

Figure 2D:
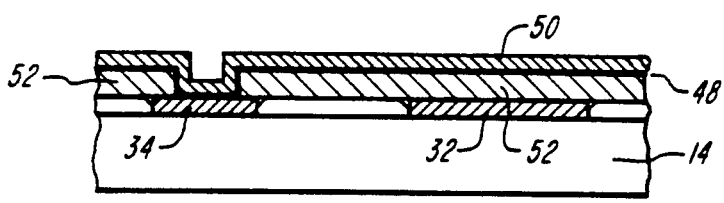
Figure 2E:
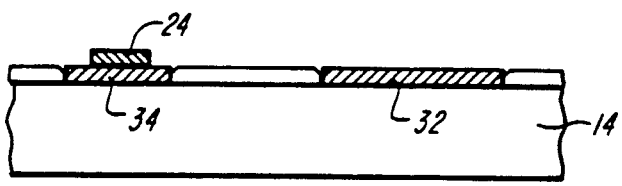

Next, the contact pad 24 is formed upon the base 34 on the upper surface 26 of the glass substrate 14, as shown in FIG. 2D. Using electron beam evaporation and a lift-off process, a thin chromium layer 48 and an aluminum layer 50 are deposited. The aluminum layer 50 may be of any desired thickness, but a 5000Å thick layer is preferred. The thin chromium layer 48 promotes adhesion between the aluminum layer 50 and the base 34. Lift-off of the resist 52 leaves the finished contact pad 24, as shown in FIG. 2E.

Figure 2F:
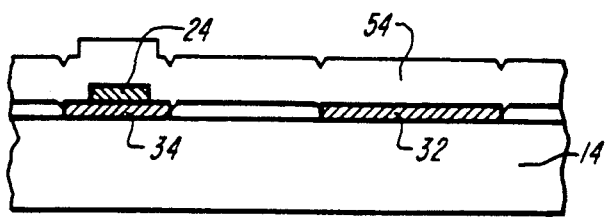
Figure 2G:
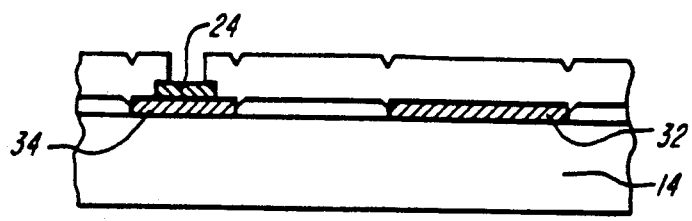

To electrically isolate the chromium film 28 of the glass substrate 14 from the silicon substrate to which it will be joined, a buffer layer 54 of dielectric material is deposited over the entire upper surface of the glass substrate 14, as illustrated in FIG. 2F. PECVD silicon oxide and sputtered pyrex (borosilicate) are both suitable for this purpose, although sputtered pyrex (borosilicate) has been found to promote stronger anodic bonding between the glass substrate 14 and the silicon substrate 12. Preparation of the glass substrate 14 is completed by removing the silicon oxide from over at least a portion of the contact pad 24, as shown in FIG. 2G and FIG. 5, using lithographic and buffered hydrofluoric acid etching techniques known in the art.

Figure 3A:
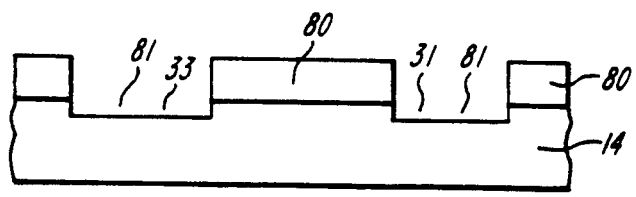
FIGS. 3A–3G illustrates steps in an alternate fabrication of the glass substrate according to another preferred embodiment of the present invention.

Referring now to FIGS. 3A–3G, an alternate construction of the glass substrate is disclosed. As shown in FIG. 3A, a photoimagable polyimide or photoresist 80 is first used to define one or more locations 31, 33 where capacitor plates, bases for contact pads, and interconnects communicating between corresponding capacitor plates and bases, will be formed. A chemical or plasma etch is then carried out to form a continuous recession or trench 81, preferably of a depth of approximately 1000Å–2000Å, comprising the locations of the capacitor plate, base and interconnect.

Figure 3B:
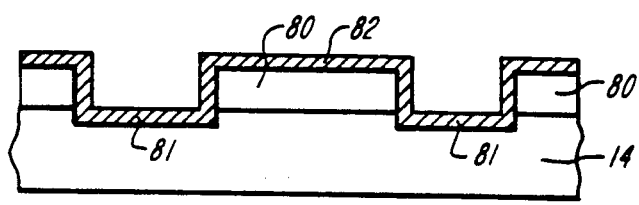
Figure 3C:
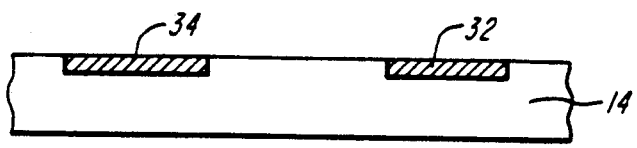

Next, as depicted in FIG. 3B, a chromium layer 82, of depth equal to that of the trench 81, is deposited by thermal or electron beam evaporation over the surface of the substrate. The photoresist 80 is then removed in an acetone bath. The resulting substrate, shown in FIG. 3C, comprises a planar surface within which is formed one or more capacitor plates 32, bases for contact pads 34, and interconnects (not shown) communicating between corresponding capacitor plates 32 and bases 34.

Figure 3D:
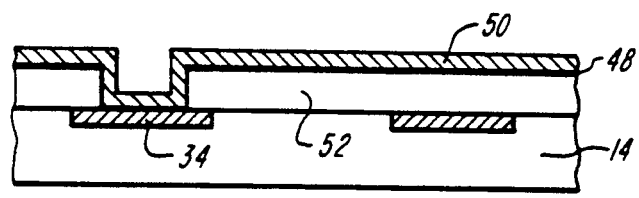
Figure 3E:
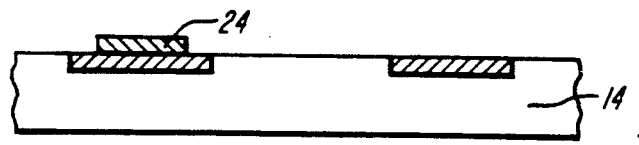

To form a contact pad upon each base 34, a lift-off process is used to deposit a thin chromium layer 48 and an aluminum layer 50 by electron beam evaporation, as depicted in FIG. 3D. The aluminum layer 50 may be of any desired thickness, but a 5000Å thick layer is preferred. The thin chromium layer 48 promotes adhesion between the aluminum layer 50 and the base 34. Lift-off of the resist 52 leaves the finished contact pad 24, as shown in FIG. 3E.

Figure 3F:
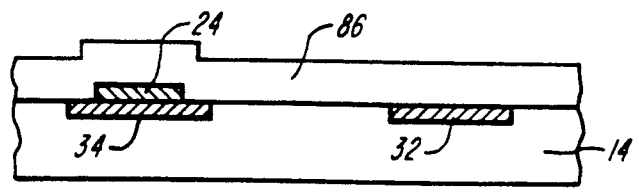
Figure 3G:
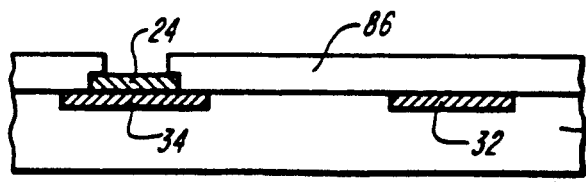

Referring now to FIG. 3F, a buffer layer 86 of a dielectric, such as a silicon oxide, is deposited over the surface of the glass substrate 14 to electrically isolate the capacitor plates 32, bases 34 and interconnects (not shown) from the silicon substrate to which it will be joined. PECVD silicon oxide and sputtered pyrex (borosilicate) are both suitable for this purpose, although sputtered pyrex has been found to promote stronger anodic bonding between the glass substrate 14 and the silicon substrate 12. Preparation of the glass substrate is completed by removing the dielectric material from over at least a portion of the contact pad 24, as shown in FIG. 3G and FIG. 5, using lithographic and buffered hydrofluoric acid etching techniques known in the art.

Figure 4A:
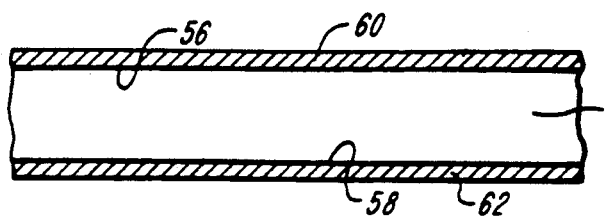
FIGS. 4A–4E illustrate steps in the fabrication of the silicon substrate according to the present invention.

The preparation of the silicon substrate 12 is illustrated in FIGS. 4A-4E. First, passivation layers 60, 62 approximately 1000Å thick are deposited on the upper 56 and lower 58 surfaces of the silicon substrate 12 as shown in FIG. 4A. Low pressure chemical vapor deposition (LPCVD) silicon nitride is a preferred material for the passivation layers 60, 62, but other suitable materials may also be used.

Figure 4B:
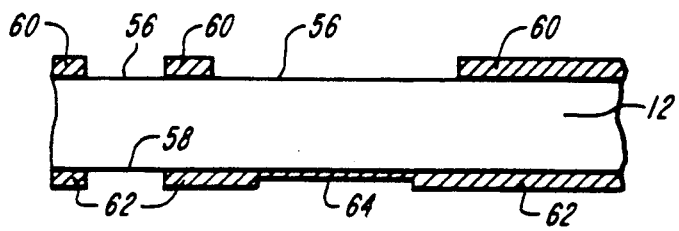

As depicted in FIG. 1 and FIG. 4B, the passivation layers 60, 62 are selectively removed, by double-sided lithography and plasma etching, from areas of the upper 56 and lower 58 surfaces of the silicon substrate 12 corresponding to the feedthrough 18 and the diaphragm 20. A second lithographic and plasma etch process, applied only to the lower surface 58 of the silicon substrate 12, is used to reduce the thickness of the passivation layer 62 by one half within a cavity area 64.

Figure 4C:
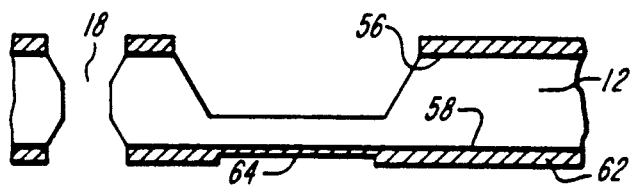

A first timed etch is performed to reduce the silicon in the diaphragm area to a thickness equal to the desired final thickness of the diaphragm 20 plus twice the depth of the cavity to be formed (as will be described) between the diaphragm and the glass substrate 14. The etch may be carried out using KOH at 80° C., or by other suitable processing conditions. Because the first timed etch removes more than half the thickness of the unmasked portions of the silicon substrate 12, the first timed etch forms the feedthrough 18 communicating between the upper 56 and lower 58 surfaces of the silicon substrate 12. The structure resulting from this first timed etch is illustrated in FIG. 4C.

Figure 4D:
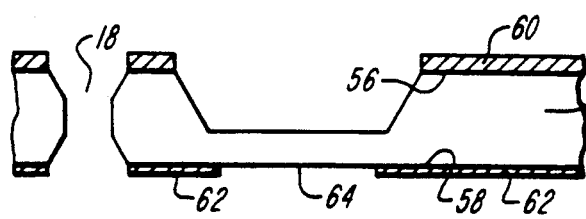

Next, as shown in FIG. 4D, a timed plasma etch is used to remove the passivation layer 62 on the lower surface 58 of the silicon substrate 12 until the passivation is completely removed from the cavity area 64. Since the thickness of the passivation layer 62 is thicker than the passivation over the cavity area 64, after the timed plasma etch a thin passivation layer 62 remains over a portion of the lower surface 58 of the substrate. The remaining passivation layer 60 on the upper surface 56 and the remaining passivation layer 62 on the lower surface 58 will mask areas of the silicon substrate 12 to form the rim 16 shown in FIG. 1. This technique avoids the need to perform a photolithographic step to delineate the cavity area 66. The application of a uniform coating of photoresist in such a photolithographic step would be complicated at this stage in the process by the presence of the feedthrough holes and deep cavities on the wafer.

Figure 4E:
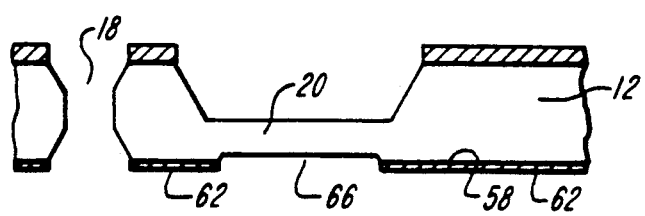

A second timed etch in KOH is used to form a cavity 66 in the lower surface 58 of the silicon substrate 12 by removing silicon from the upper and lower surfaces of the diaphragm 20 until the desired cavity depth is obtained, as depicted in FIG. 4E. For a typical capacitive pressure sensor of approximately 5 mm width, a cavity depth of about 5 μm is preferred.

The remaining passivation is then stripped from the silicon substrate 12 using hydrofluoric acid. The metallized area 22, shown in FIG. 1, is formed on the rim of the upper surface 56 of the silicon substrate 12 by evaporation of aluminum through a shadow mask, or by other known means.

The silicon substrate 12 and the glass substrate 14 are then aligned such that each capacitor plate 32 of the glass substrate 14 corresponds to a diaphragm 20 of the silicon substrate 12, and such that each feedthrough 18 in the silicon substrate 12 communicates to a contact pad 24 on the glass substrate 14. The assembled substrates are heated in a vacuum chamber to a temperature of approximately 400° C. and joined by application of a voltage of 300-500 V for 5 to 10 minutes to effect an anodic bond between the silicon substrate 12 and the buffer layer 54 of the glass substrate 14.

As previously noted, the present invention is particularly suited to batch production of capacitive absolute pressure sensors such as 10, and when a plurality of individual sensors are formed by providing multiple copies of the respective elements in the silicon substrate 12 and the glass substrate 14, the individual sensors 10 may be separated by dicing the bonded assembly.

The various preferred embodiments of the invention described in detail above are intended only to illustrate the invention. Those skilled in the art will recognize from this disclosure that modifications, additions and substitutions can be made in the various features and elements without departing from the true scope and spirit of the invention. The following claims are intended to cover the true scope and spirit of the invention.

We claim:

1. A method for fabricating a capacitive absolute pressure sensor comprising the steps of:
   (A) preparing an electrically conductive semiconductor substrate from a wafer having an upper surface and a lower surface and comprising a diaphragm, means for electrically connecting the semiconductor substrate to an external electrical circuit, and means electrically isolated from the semiconductor substrate wafer for connecting the external electrical circuit to a capacitor plate on a dielectric substrate;
   (B) preparing said dielectric substrate by disposing a metal capacitor plate and means for connecting the metal capacitor plate to the external electrical circuit upon an upper surface of said dielectric substrate, and by covering the upper surface of the dielectric substrate, including said metal capacitor plate and said means for connecting the metal capacitor plate to the external electrical circuit, but excluding an area adjacent the means for connecting the metal capacitor plate to the external electrical circuit, with a buffer layer of nonconductive material; and, (C) joining the semiconductor substrate to the dielectric substrate such that a capacitive chamber is formed between the diaphragm of the semiconductor substrate and the metal capacitor plate of the dielectric substrate, and such that a hermetic seal is formed between said diaphragm and said metal capacitor plate.

2. The method for fabricating a capacitive absolute pressure sensor of claim 1 wherein the diaphragm is formed by selectively removing material from both sides of the semiconductor substrate within a surrounding rim.

3. The method for fabricating a capacitive absolute pressure sensor of claim 1 wherein the means for electrically connecting the semiconductor substrate to an external electrical circuit is a metallized area formed on the upper surface of the semiconductor substrate.

4. The method for fabricating a capacitive absolute pressure sensor of claim 1 wherein the means electrically isolated from the semiconductor substrate material for connecting said external electrical circuit to a dielectric substrate is a feedthrough communicating between the upper surface of the semiconductor substrate and the dielectric substrate.

5. The method for fabricating a capacitive absolute pressure sensor of claim 1 wherein:
said diaphragm is formed by selectively removing material from both sides of the semiconductor substrate within a surrounding rim;
said means for electrically connecting the semiconductor substrate to an external electrical circuit is a metallized area formed on the upper surface of the semiconductor substrate; and,
said means electrically isolated from the semiconductor substrate material for connecting said external electrical circuit to a dielectric substrate is a feedthrough communicating between the upper surface of the semiconductor substrate and the dielectric substrate.

6. The method for fabricating a capacitive absolute pressure sensor of claim 1 wherein the semiconductor substrate is prepared by depositing passivation layers of silicon nitride on the upper and lower surfaces of the semiconductor substrate, by selectively removing the passivation layers from the areas of the semiconductor substrate at which a feedthrough corresponding to a contact pad of the dielectric substrate and a diaphragm corresponding to the metal capacitor plate of the dielectric substrate are to be formed, by selectively removing additional silicon nitride from only the lower surface of the semiconductor substrate to reduce the thickness of the passivation layer by one half within a cavity area corresponding to the diaphragm, by removing semiconductor substrate material from the unmasked areas of the semiconductor substrate to reduce the diaphragm area to a thickness equal to the desired final thickness of the diaphragm plus twice the depth of the cavity to be formed between the diaphragm and the dielectric substrate, by forming the said feedthrough, corresponding to the contact pad on the dielectric substrate and communicating between the upper and lower surfaces of the semiconductor substrate, by reducing the thickness of the passivation layer on the lower surface of the silicon substrate until the passivation is completely removed from the cavity area, by removing additional semiconductor substrate material from the unmasked upper and lower surfaces of the semiconductor substrate to reduce the upper and lower surfaces of the diaphragm until the desired cavity depth is obtained, thereby forming a cavity in the lower surface of the silicon substrate, by stripping the remaining passivation from the silicon substrate, and by forming a metallized area on the rim associated with the diaphragm on the upper surface of the silicon substrate by evaporation of aluminum through a shadow mask.

7. The method for fabricating a capacitive absolute pressure sensor of claim 1 wherein the means for connecting the metal capacitor plate to an external electrical circuit is formed by the same means as the metal capacitor plate is formed.

8. The method for fabricating a capacitive absolute pressure sensor of claim 1 wherein the buffer layer comprises PECVD silicon oxide or sputtered pyrex (borosilicate).

9. The method for fabricating a capacitive absolute pressure sensor of claim 1 wherein the metal capacitor plate is formed by the deposition and selective removal of a layer of metal on the surface of the dielectric substrate.

10. The method for fabricating a capacitive absolute pressure sensor of claim 1 wherein the said metal capacitor plate and the said means for electrically connecting the metal capacitor plate to an external electrical circuit are formed by depositing a layer of metal on the said upper surface of the dielectric substrate and selectively removing said metal such that the remaining metal comprises a capacitor plate, a base adapted to connect the capacitor plate to an external electrical circuit, and an electrically conductive interconnect between the base and the capacitor plate.

11. The method for fabricating a capacitive absolute pressure sensor of claim 1 wherein the dielectric substrate is prepared by a series of steps comprising:
(A) metallizing an upper surface of the dielectric substrate,
(B) selectively removing the metal layer using a photoresist and chemical etching to form a capacitor plate, a base for a contact pad associated with the capacitor plate and an interconnect electrically connecting the base to the capacitor plate,
(C) depositing, prior to removal of the photoresist, a silicon oxide layer of thickness equal to that of the metal layer over the entire surface of the substrate,
(D) removing the photoresist,
(E) forming a contact pad upon the base,
(F) depositing a buffer layer of silicon oxide over the entire surface of the glass substrate; and,
(G) removing the silicon oxide from over at least a portion of the contact pad.

12. The method for fabricating a capacitive absolute pressure sensor of claim 1 wherein the dielectric substrate is prepared by a series of steps comprising:
(A) metallizing an upper surface of the glass substrate by electron beam evaporation of a chromium layer 1000Å–2000Å thick;
(B) selectively removing the chromium layer using a lithographic photoresist and chemical etching to form a plurality of capacitor plates, a base for a contact pad associated with each capacitor plate and an interconnect electrically connecting each base to each associated capacitor plate;
(C) depositing, after the etching and prior to removal of the photoresist, a silicon oxide layer of thickness equal to that of the chromium layer over the entire surface of the substrate;
(D) removing the lithographic photoresist;

(E) forming by electron beam evaporation a contact pad upon each base comprising a thin chromium layer and an aluminum layer approximately 5000Å thick;

(F) depositing a buffer layer of silicon oxide over the entire surface of the glass substrate; and, (G) removing the silicon oxide from over at least a portion of each contact pad.

13. The method for fabricating a capacitive absolute pressure sensor of claim 1 wherein the step (B) further comprises a first step of forming a continuous trench comprising the locations of the capacitor plate, base and interconnect within the upper surface of the dielectric substrate, and wherein the thickness of the layer of metal deposited on the upper surface of the dielectric substrate is equal to the depth of said continuous trench.

14. The method for fabricating a capacitive absolute pressure sensor of claim 1 wherein the dielectric substrate is prepared by a series of steps comprising:

(1) forming a continuous trench comprising the locations of the metal capacitor plate, a base and an interconnect within the upper surface of the dielectric substrate;

(2) metallizing said upper surface of the dielectric substrate;

(3) selectively removing the metal layer to form the metal capacitor plate, the said base for a contact pad associated with the capacitor plate and the said interconnect electrically connecting the base to the capacitor plate;

(4) forming a contact pad upon the said base;

(5) depositing a buffer layer of silicon oxide over the entire surface of the glass substrate; and, (6) removing the silicon oxide from over at least a portion of the contact pad.

15. The method for fabricating a capacitive absolute pressure sensor of claim 1 wherein the dielectric substrate is prepared by a series of steps comprising:

(A) forming a continuous trench approximately 1000Å-2000Å deep comprising the locations of the metal capacitor plate, a base and an interconnect within the upper surface of the dielectric substrate;

(B) metallizing said upper surface of the glass substrate by electron beam evaporation of a chromium layer of thickness equal to the depth of said trench;

(C) selectively removing the chromium layer using a lithographic photoresist and chemical etching process to form a plurality of metal capacitor plates, a base for a contact pad associated with each capacitor plate and an interconnect electrically connecting each base to each associated capacitor plate;

(D) forming by electron beam evaporation a contact pad upon each base comprising a thin chromium layer and an aluminum layer approximately 5000Å thick;

(E) depositing a buffer layer of silicon oxide over the entire surface of the glass substrate; and, (F) removing the silicon oxide from over at least a portion of each contact pad.

16. The method for fabricating a capacitive absolute pressure sensor of claim 1 wherein the semiconductor substrate is joined to the dielectric substrate by anodic bonding between the semiconductor substrate and the buffer layer of the dielectric substrate.

17. The method for fabricating a capacitive absolute pressure sensor of claim 16 wherein the anodic bond between the semiconductor substrate and the buffer layer of the dielectric substrate is effected by heating and applying a voltage across the semiconductor substrate and the dielectric substrate.

18. A batch manufacturing method for fabricating a plurality of capacitive absolute pressure sensors comprising the steps of:

(A) fabrication of a glass substrate by metallizing an upper surface of the glass substrate by electron beam evaporation of a chromium layer 1000Å-2000Å thick, by selectively removing the chromium layer using a lithographic photoresist and chemical etching to form a plurality of capacitor plates, a base for a contact pad associated with each capacitor plate and an interconnect electrically connecting each base to each associated capacitor plate, by depositing, after the etching and prior to removal of the photoresist, a silicon oxide layer of thickness equal to that of the chromium layer over the entire surface of the substrate, by removing the lithographic photoresist, by forming by electron beam evaporation a contact pad upon each base comprising a thin chromium layer and an aluminum layer approximately 5000Å thick, by depositing a buffer layer of silicon oxide over the entire surface of the glass substrate; and by removing the silicon oxide from over at least a portion of each contact pad;

(B) fabrication of a silicon substrate having an upper surface and a lower surface by depositing passivation layers approximately 1000Å thick on the upper and lower surfaces of the silicon substrate, by selectively removing the passivation layers by double-sided lithography and plasma etching from the areas of the silicon substrate at which a feedthrough corresponding to each contact pad of the glass substrate and a diaphragm corresponding to each capacitor plate of the glass substrate are to be formed, by performing a second photolithographic plasma etch to only the lower surface of the silicon substrate to reduce the thickness of the passivation layer by one half within a cavity area corresponding to each diaphragm, by performing a first timed etch to reduce the silicon in each diaphragm area to a thickness equal to the desired final thickness of the diaphragm plus twice the depth of the cavity to be formed between the diaphragm and the glass substrate and to form a feedthrough, corresponding to each contact pad on the glass substrate, communicating between the upper and lower surfaces of the silicon substrate, by performing a timed plasma etch to reduce the thickness of the passivation layer on the lower surface of the silicon substrate until the passivation is completely removed from each cavity area, by performing a second timed etch to reduce the upper and lower surfaces of each diaphragm until the desired cavity depth is obtained, thereby forming a plurality of cavities in the lower surface of the silicon substrate, by stripping the remaining passivation from the silicon substrate, and by forming a metallized area on the rim associated with each diaphragm on the upper surface of the silicon substrate by evaporation of aluminum through a shadow mask;

(C) alignment of the silicon substrate and the glass substrate such that each capacitor plate of the glass substrate corresponds to a diaphragm of the silicon substrate, and such that each feedthrough in the silicon substrate communicates to a contact pad on the glass substrate;

(D) joinder of the assembled substrates by heating in a vacuum chamber to a temperature of approximately 400° C. and applying a voltage of 300–500 V until an anodic bond is formed between the silicon substrate and the buffer layer of the glass substrate; and, (E) separating the individual capacitive absolute pressure sensors from the bonded assembly.

19. A batch manufacturing method for fabricating a plurality of capacitive absolute pressure sensor assemblies comprising the steps of:

(A) fabrication of a dielectric substrate by forming a plurality of continuous trenches approximately 1000Å–2000Å deep, each trench comprising the locations of a capacitor plate, a base for a contact pad associated with each capacitor plate and an interconnect adapted to electrically connect each base to each associated capacitor plate, within an upper surface of the dielectric substrate, by metallizing said upper surface of the dielectric substrate by electron beam evaporation with a chromium layer of thickness equal to the depth of the trenches, by selectively removing the chromium layer to form in each trench capacitor plates, a base for a contact pad associated with each capacitor plate and an interconnect electrically connecting each base to each associated capacitor plate, by forming by electron beam evaporation a contact pad upon each base, the contact pad comprising a thin chromium layer and an aluminum layer approximately 5000Å thick, by depositing a buffer layer of silicon oxide over the entire surface of the dielectric substrate; and by removing the silicon oxide from over at least a portion of each contact pad;

(B) fabrication of a silicon substrate from a doped silicon wafer by depositing passivation layers approximately 1000Å thick on an upper and a lower surface of the wafer, by selectively removing the passivation layers by double-sided lithography and plasma etching from the areas of the silicon substrate at which a feedthrough corresponding to each contact pad of the dielectric substrate and a diaphragm corresponding to each capacitor plate of the dielectric substrate are to be formed, by performing a second photolithographic plasma etch process to only the lower surface of the silicon substrate to reduce the thickness of the passivation layer by one half within a cavity area corresponding to each diaphragm, by performing a first timed etch to reduce the silicon in each diaphragm area to a thickness equal to a desired final diaphragm thickness plus twice the depth of the cavity to be formed between the diaphragm and the dielectric substrate and to form said feedthroughs, communicating between the upper and lower surfaces of the silicon substrate, by performing a timed plasma etch to reduce the thickness of the passivation layer on the lower surface of the silicon substrate until the passivation is completely removed from each cavity area, by performing a second timed etch to reduce the upper and lower surfaces of each diaphragm until the desired cavity depth is obtained, thereby forming a plurality of cavities in the lower surface of the silicon substrate, by stripping the remaining passivation from the silicon substrate, and by forming a metallized area adjacent each diaphragm on the upper surface of the silicon substrate by evaporation of aluminum through a shadow mask;

(C) alignment of the silicon substrate and the dielectric substrate such that each capacitor plate of the dielectric substrate registers with a corresponding diaphragm of the silicon substrate, and such that each feedthrough in the silicon substrate communicates to a corresponding contact pad on the dielectric substrate;

(D) joinder of the assembled substrates by heating in a vacuum chamber to a temperature of approximately 400° C. and applying a voltage of 300–500 V until an anodic bond is formed between the silicon substrate and the buffer layer of the dielectric substrate; and, (E) separating the individual capacitive absolute pressure sensors from the bonded assembly.

* * * * *